United States Patent [19]
McCambridge

[11] 4,407,607
[45] Oct. 4, 1983

[54] FLUID DYNAMIC EROSION CONTROL UNIT

[76] Inventor: Joseph McCambridge, 12 Watson La., Setauket, N.Y. 11733

[21] Appl. No.: 346,264

[22] Filed: Feb. 5, 1982

[51] Int. Cl.³ .................................................. E02B 3/04
[52] U.S. Cl. ....................................... 405/26; 405/22; 441/22
[58] Field of Search .................................... 405/15-35; 441/22, 30, 133

[56] References Cited

U.S. PATENT DOCUMENTS

| | | | |
|---|---|---|---|
| 2,917,755 | 12/1959 | Peck | 441/30 |
| 3,068,655 | 12/1962 | Murray et al. | 405/22 |
| 3,148,509 | 9/1964 | Laurie | 405/22 |
| 3,328,750 | 6/1967 | Gimber et al. | 441/133 X |
| 3,755,836 | 9/1973 | Milazzo | 441/22 |
| 3,846,990 | 11/1974 | Bowley | 405/26 |
| 3,848,419 | 11/1974 | Bowley | 405/26 |
| 4,130,994 | 12/1978 | Van Moss | 405/24 |

Primary Examiner—Dennis L. Taylor
Attorney, Agent, or Firm—Robert E. Burns; Emmanuel J. Lobato; Bruce L. Adams

[57] ABSTRACT

A fluid dynamic erosion control unit comprises a hollow submersible body the buoyancy of which can be regulated. Arms projecting radially from the body carry paddle-like blades in at least some of which there are openings provided with flapper valves for permitting water to flow through the openings in one direction but not in the other. The unit is submerged in the water and rotatable about a vertical axis. When water flows past the unit, it exerts greater force on blades at one side where the valves are closed than on blades at the other side where the valves open, thereby causing the unit to rotate. The units can be used to protect a shoreline from erosion by creating turbulence which dissipates wave and current action and on the other hand can be used to effect local erosion below the units to protect waterways, harbors and moorings from silting-up.

19 Claims, 8 Drawing Figures

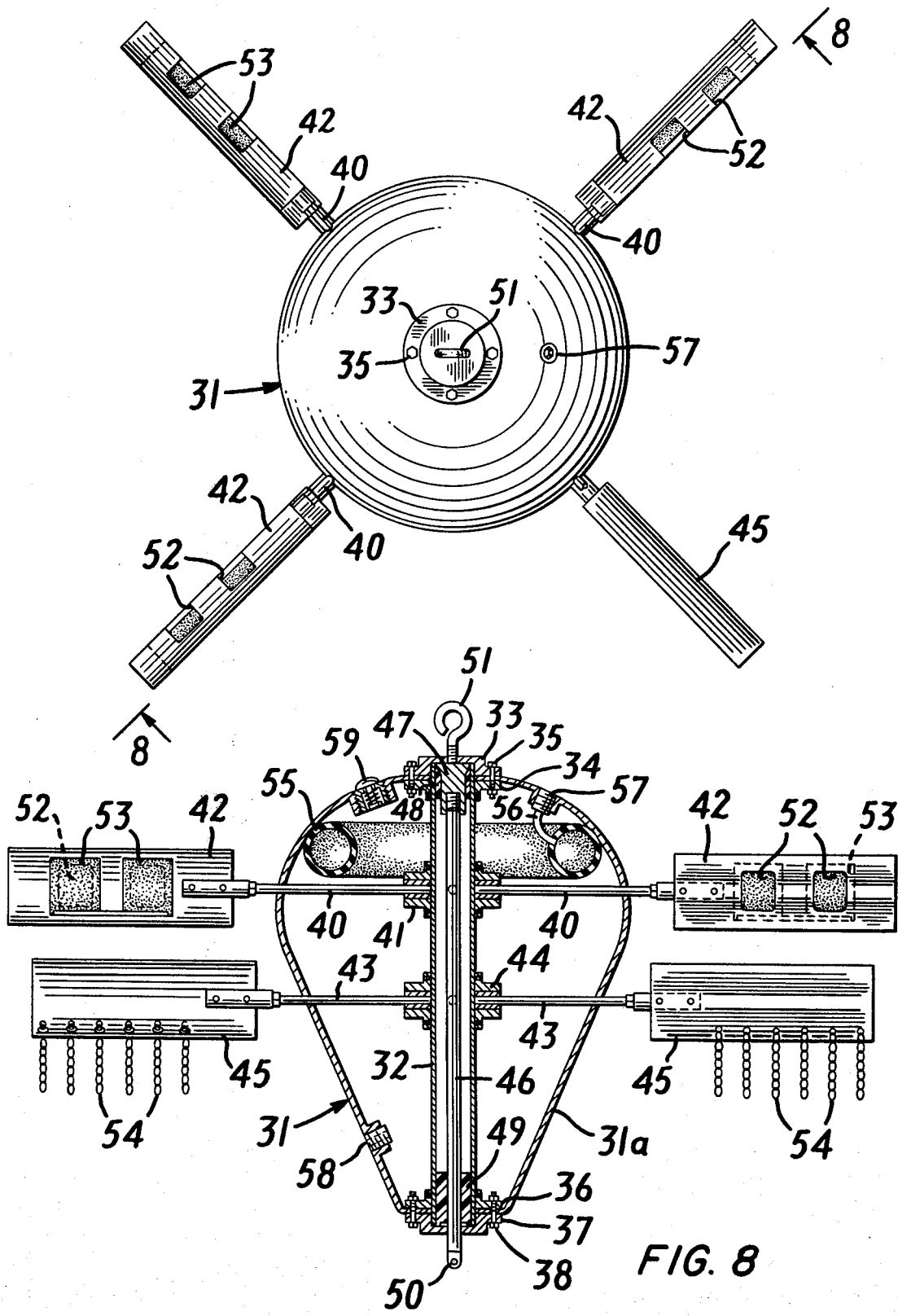

FLUID DYNAMIC EROSION CONTROL UNIT

REFERENCE TO PRIOR APPLICATION

The present invention is a further development of the invention disclosed in my prior application Ser. No. 072,939 filed Sept. 6, 1979, now U.S. Pat. No. 4,264,233.

FIELD OF INVENTION

The present invention relates to controlling the erosion by wave or current action in waterways or along coast lines. The control of erosion has two aspects. One aspect is to prevent erosion, for example along a shoreline of a lake, river, sound, bay, ocean or other body of water. The second aspect is to promote erosion, for example in waterways, to prevent their being clogged by deposits of sand or silt. Fluid dynamic erosion control units in accordance with the present invention can be judiciously used to serve both of these functions.

BACKGROUND OF THE INVENTION

The ravages of coastal erosion are widespread throughout the world. Beaches are destroyed or seriously damaged by continued erosion. In some areas the coastline recedes to such an extent that valuable land is lost and buildings fall into the sea.

Many attempts have been made to prevent or at least to reduce coastal erosion. These have included the erection of stone jettees, breakwaters and sea walls and the planting of variously shaped barriers along a beach or coastline. Further it has been proposed to anchor floating wave barriers in the water near the shoreline. However, these devices have not come into wide use apparently because of high cost and ineffectiveness.

On the other hand, a serious problem arises from the deposit of slit and sand in waterways, anchorages and harbors and alongside docks. For example channels and other waterways may become so filled by sand or silt that they are no longer navigable by vessels of a size for which they are intended. Likewise deposits of sand or silt adjacent piers or docks may make it impossible for vessels of substantial draft to reach them. Such deposits can be removed by dredging but this is an expensive operation. By reason of limited funds, the U.S. Coast Guard has ceased to dredge areas which they previously maintained. By reason of this, waterways, anchorages, piers and docks have been rendered virtually useless by reason of deposits of sand or silt.

SUMMARY OF THE INVENTION

It is an object of the present invention to provide an effective and economically feasible system for protecting a shoreline from erosion. In accordance with the invention one or more rows of submerged fluid dynamic erosion control units are anchored in the water near the shoreline. These units deflect subsurface wave motion and currents by creating turbulence which dissipates the energy of the wave action and thereby protects the coast from erosion.

On the other hand, fluid dynamic erosion control units in accordance with the present invention can be used to inhibit the depositing of sand or silt in locations where this is undesirable and to remove deposits which have already been formed. In accordance with the invention the unit comprises a hollow submersible body, the buoyancy of which can easily be regulated. A plurality of arms extending laterally from the body carry paddle-like blades each of which has a variable effective area. The body is positioned in the water in submerged position at the desired depth and is rotatable about an approximately vertical axis. Rotation of the unit is effected by wave or current action. By virtue of the variable effective area of the paddles, flow of water past the unit produces rotation by exerting a greater force on blades of larger effective area when moving in the direction of water flow than on blades of reduced effective area when moving in a direction against the flow of water. A preferred means for reducing the effective area of the blades comprises providing one or more openings in each blade and associated valve means for permitting the flow of water through the openings in one direction while blocking the flow of water through the openings in the opposite direction. The valves are conviently in the form of flexible flaps which are secured to the blades adjacent the openings and movable between a closed position in which the flaps cover the openings and an open position in which the flaps uncover the openings.

Upon rotation of the unit in this manner, the paddles create turbulence and currents which in effect "excavate" sand or silt in the vicinity of the unit. In one embodiment of the invention the unit has two sets of blades disposed one above another. Blades of the upper set are provided with openings and valves so as to produce rotation of the unit in the manner described. The blades of the upper set thus provide means for driving the unit. Blades of the lower set are absent the openings and valves and constitute in effect "excavating" means for creating turbulence and currents to effect removal of adjacent deposits of sand or silt. To render the units still more effective, appendages such as chains, may hang down from lower edges of the blades. When the unit has two sets of blades as described, such appendages are advantageously provided only on the lower blades.

While fluid dynamic control units in accordance with the invention can be used as described above to prevent the deposit of silt or sand and to remove previously formed deposits, the units can also judiciously be used to prevent erosion of a shore or coastline. When anchored in the water in submerged condition in judiciously selected locations, the units create turbulence which dissipates the energy of wave action and thereby protects the shore or coast from erosion.

BRIEF DESCRIPTION OF THE DRAWINGS

The nature, objects and advantages of the invention will appear more fully from the following description of preferred embodiments shown by way of example in the accompanying drawings in which:

FIG. 7 is a top plan view of another embodiment of the invention; and

FIG. 8 is a composite vertical section taken in general on the line 8—8 in FIG. 7 but with portions in a different plane as will be apparent from FIG. 7.

DESCRIPTION OF PREFERRED EMBODIMENTS

Figure 1:
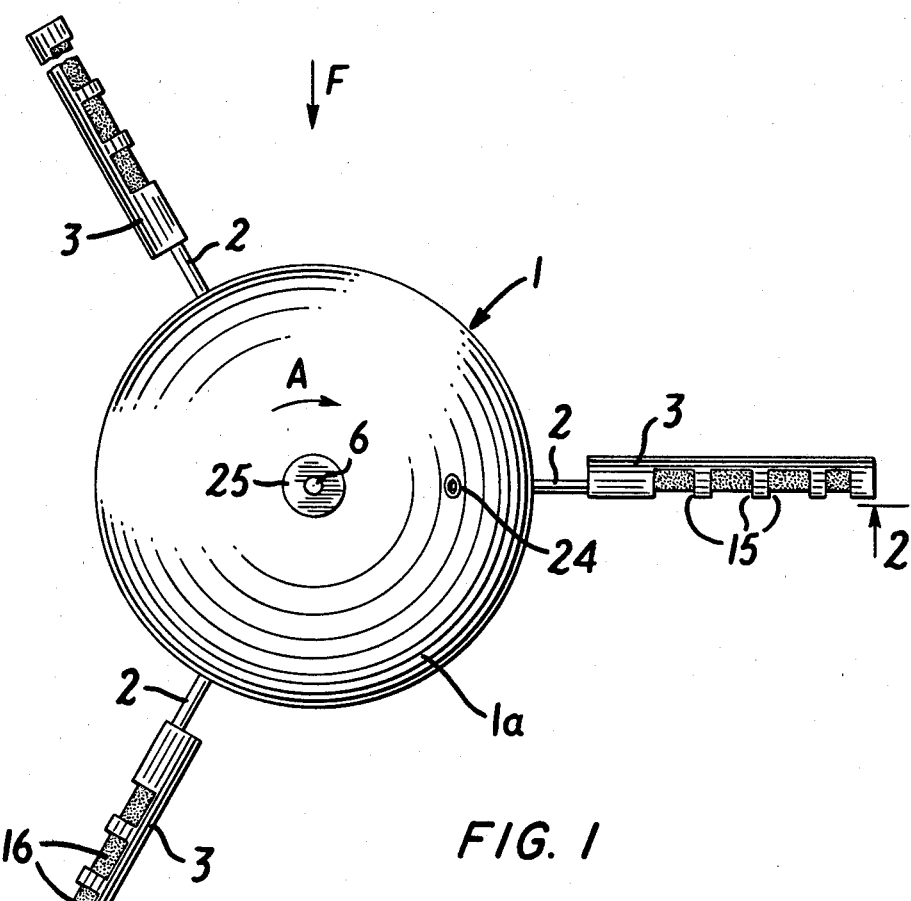
FIG. 1 is a top plan view of a fluid dynamic erosion control unit in accordance with the invention.

A fluid dynamic erosion control unit in accordance with the present invention is shown by way of example in FIG. 1 as comprising a hollow submersible body 1 having a shell 1a formed of suitable material which is resistant to corrosion or attack by water including sea water. The shell is, for example, formed of plastic preferably reinforced by glass fibers. Although the shell is shown as being one piece, it is customarily formed in two halves which may be permanently joined for example by adhesive or welding or may be separably joined for example by having overlapping portions united by means of screws. The body 1 is formed as a body of revolution about a vertical axis. While it is shown by way of example as being spherical, it may be of other shape, for example ovoid or cylindrical.

A plurality of arms 2 extending radially from the body 1 carry paddle-like blades 3. The arms 2 have inner ends fixed to a central bearing block 4 and extend out through the shell 1a of the body. The blades 3 are mounted on outer ends of the arms for example by screws or rivets 5. The number of arms and blades can be varied as desired but should be not less than three and usually not more than eight.

Figure 3:
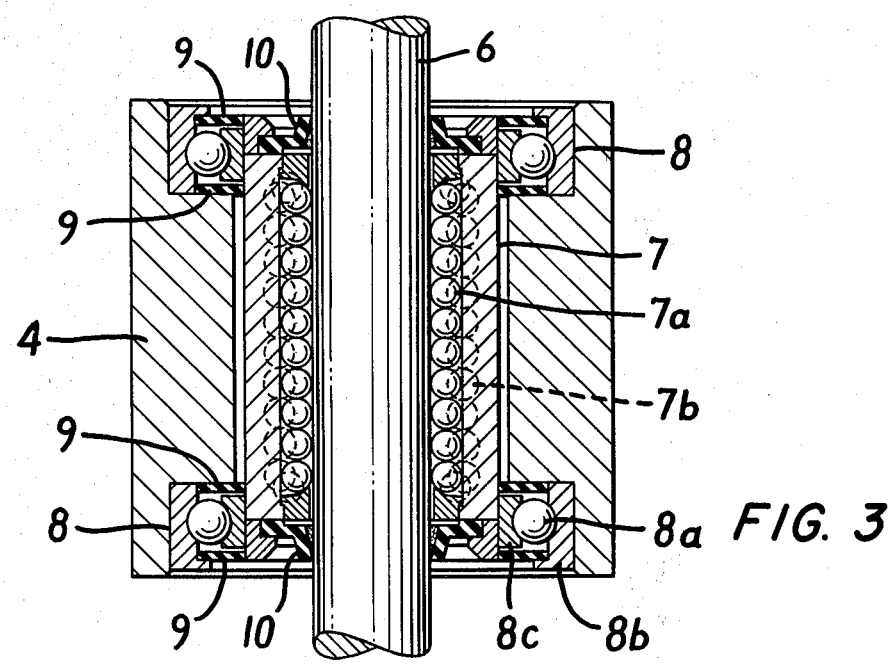
FIG. 3 is a fragmentary vertical section showing a bearing for rotatably mounting the unit on a shaft.

The unit comprising the body 1, arms 2 and blades 3 is rotatable on a shaft 6 and is also movable longitudinally of the shaft by means of a bearing assembly in the central bearing block 4. As shown by way of example in FIG. 3, the bearing assembly comprises a lineal ball bearing 7 mounted in the bearing block 4 by two radial ball bearings 8 disposed at opposite ends of the lineal bearing. The lineal ball bearing comprises a multiplicity of balls 7a which run in longitudinal channels in a body 7b in engagement with the shaft 6 and connecting submerged channels in the body as shown in dotted lines. Such bearings are available for example from Thompson Industries, Inc. of Manhasset, N.Y. 11030. The radial ball bearings 8 comprise in usual manner a multiplicity of balls 8a running between an outer race 8b and an inner race 9c. The radial bearings 8 are provided with watertight seals 9 while seals 10 are provided between opposite ends of the lineal bearing 7 and the shaft 6. The bearing assembly is permanently lubricated, the seals 9 and 10 retaining the lubricant and excluding water from the bearings. With the bearing assembly shown in FIG. 3, the lineal ball bearing provides for movement of the hollow body 1 longitudinally of the shaft 6 while the radial ball bearings 8 provide for its rotation.

Figure 4:
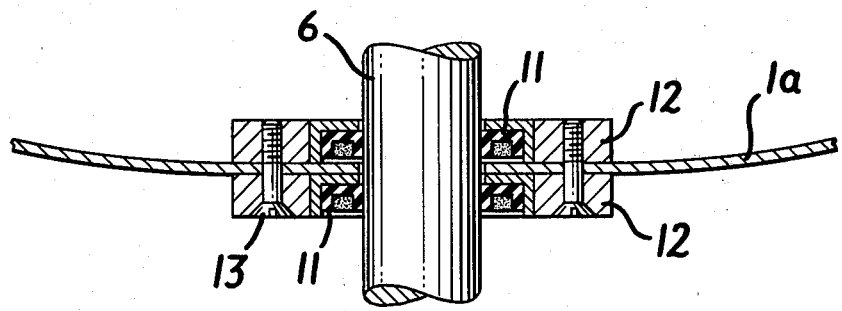
FIG. 4 is a fragmentary vertical section showing a seal for the shaft.
Figure 5:
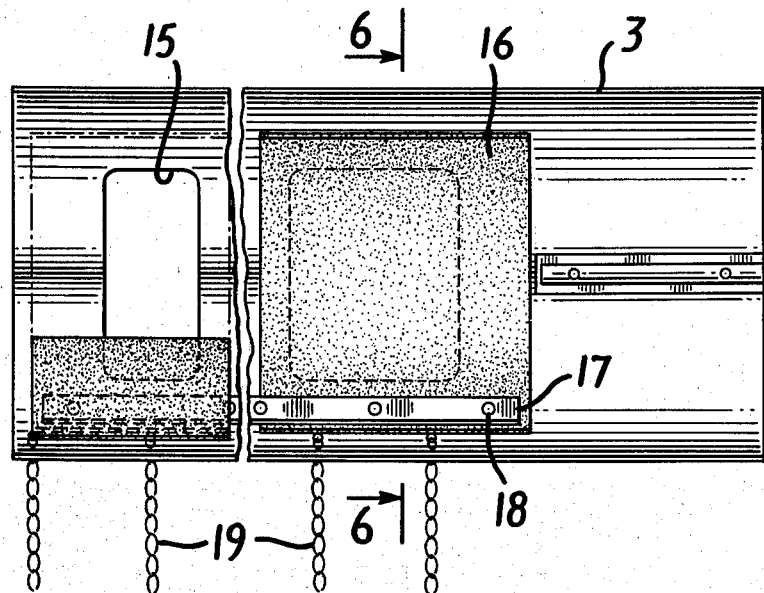
FIG. 5 is a vertical elevation of a portion of one paddle-like blade of the unit.

Seals are also provided for the shaft 6 where it passes through the shell 1a of the hollow body 1. As illustrated by way of example in FIG. 4, such seals comprise annular sealing rings 11 of U-shaped cross section set in plates 12 disposed inside and outside adjacent portions of the shell 1a and secured together for example by screws 13. The seals 11 are not intended to exclude water from the hollow body, since—as will be described below—water is used as ballast, but rather are to exclude abrasive particles such as dirt and sand. For this purpose both the inner and the outer sealing rings face outwardly as shown in FIG. 4. While FIG. 4 shows the seals at the bottom of the shell 1a, it will be understood that the seals at the top of the shell are the same but are reversed so that both seals face outwardly. It will further be understood that the seals 11 do not interfere with rotation of the hollow body 1 on the shaft 6 or its movement longitudinally of the shaft.

In order to promote rotation of the unit by a flow of water past the unit, means is provided for reducing the effective area of the blades when moving against the flow of water. By "effective area" is meant the area of a projection of the blade on a vertical plane. The effective area of the blades can, for example, be reduced by tilting the blades or a portion of the blades or by means of pivoted flaps. However, as illustrated by way of example in the drawings, the effective area of the blades is varied by providing at least one opening in each blade and valve means for permitting flow of water through the opening in one direction while blocking flow of water through the opening in the opposite direction.

Figure 6:
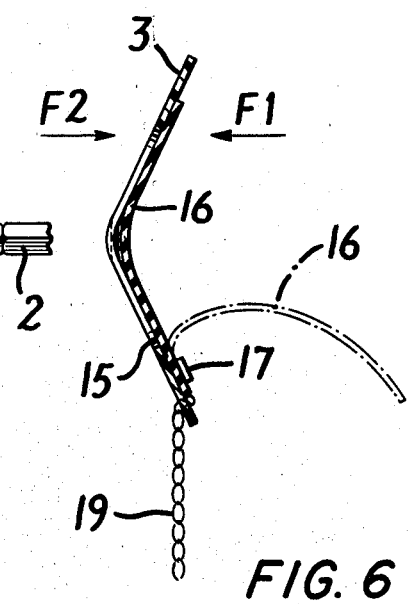
FIG. 6 is a cross section of the blade taken approximately on the line 6—6 of FIG. 5.

As illustrated by way of example in FIGS. 1, 2, 5 and 6, each of the blades 3 is provided with a plurality of openings 15. Means for opening and closing the openings is shown as comprising flexible flaps 16 secured to the blades adjacent the openings by strips 17 and screws or rivets 18. The flaps 16 are conviently made of flexible rubber material which may or may not be reinforced by fibers. When there is a flow of water in the direction indicated by the arrow F1 in FIG. 6, the flap 16 is in the solid line position closing the respective opening and hence preventing flow of water therethrough. When the flow of water is in the opposite direction as indicated by the arrow F2, the flap 16 flexes to the position shown in broken lines thereby permitting water to flow through the respective opening. Thus the effective area of the blade 3 is less with respect to flow of water in the direction of the arrow F2 than with respect to flow of water in the direction F1. By reason of this reduction in the effective area of the blades when moving against a flow of water past the unit, a flow of water in the direction indicated by the arrow F in FIG. 1 produces rotation of the unit in a clockwise direction as indicated by the arrow A. As seen in FIG. 6, the flap 16 is secured to the blade 3 below the respective opening 15. With this arrangement the force of gravity assists in holding the flap 16 in closed position and also in open position thus making the action of the valve more positive.

Upon rotation of the unit, the paddle-like blades 3 create turbulence in the surrounding water. This has two effects. IF one or more rows of the units are positioned in the water a selected distance off shore, the turbulence created by the rotating units dissipates wave and current action and thereby protects the shoreline from erosion. On the other hand, if units are positioned near the bottom in a channel, waterway or mooring area or adjacent piers or docks the turbulence produced by rotation of the units stirs up the underlying bottom so as to prevent deposits of sand or silt and even remove deposits which have already occurred.

As seen in FIG. 6, the blades are concavo-convex in cross section. The valve flaps 16 are on the concave side of the blades. At the inner end of each blade a central portion is flattened for attachment to the respective arm 2. The cross sectional shape of the blades imparts greater strength and stiffness to the blades, and contributes to rotation of the unit and to the turbulence which it creates. The excavating or dredging action of the unit is increased by flexible erosion elements 19 which depend from lower edges of the blades. These can for example be short lengths of chain which are secured to the blade below the valve flaps 16.

Means is provided for regulating the buoyancy of the body 1 so that it tends to rise or alternatively to sink slowly or to remain at the same level. As illustrated by way of example in FIG. 2, the means for regulating the buoyancy of the body comprises an inflatable and expandable bladder 20 shown in the form of a rubber ring. Water is admitted to the inside of the hollow body 1 through a small hole in a screw plug 21 in a lower part of the shell 1a. Water fills the hollow body 1 except for the space occupied by the bladder 20 and serves as ballast. A vent valve 22 in an upper portion of the shell 1a permits air to escape from the shell as the water enters. The vent valve is shown as comprising a small mushroom-shaped valve member and a light spring which acts on the stem of the valve member to maintain the valve normally in closed position and thus prevent entry of sand or dirt. The air bladder 20 is connected by a tube 23 to a valve and coupling element 24 in the shell 1a of the hollow body so that the size of the air bladder 20 and hence the volume of water ballast in the hollow body 1 can be regulated by forcing air into or exhausting air from the bladder 20. It will be understood that when the bladder 20 is inflated so as to increase its volume and thereby decrease the volume of water in the hollow body, the buoyancy of the body is increased. Conversely, exhausting air from the bladder 20 so as to decrease its size permits more water to enter the hollow body, thereby decreasing its buoyancy.

In use, fluid dynamic erosion control units in accordance with the present invention are installed in selected locations by driving the shaft 6 into the bottom. The buoyancy of the hollow body 1 is adjusted by selected inflation of the air bladder 20. In water less than 20 feet deep this can ordinarily be done at the surface. When the unit is to be installed in water more than 20 feet deep, adjustment of buoyancy is preferably done by a diver using a compressed air hose in much the same manner as inflating a tire. If a unit is to be used for "dredging," buoyancy of the hollow body 1 is adjusted to a slightly negative value so that the body tends to sink slowly as erosion of sand or silt beneath the unit proceeds. In other applications the buoyancy may be adjusted to a slightly positive value so that the unit tends to rise. Upward movement is limited by a collar 25 which is secured to the shaft 6 at selected height by a set screw 26, while downward movement is limited by a collar 27 secured to the shaft at a selected height by a set screw 28.

Figure 2:
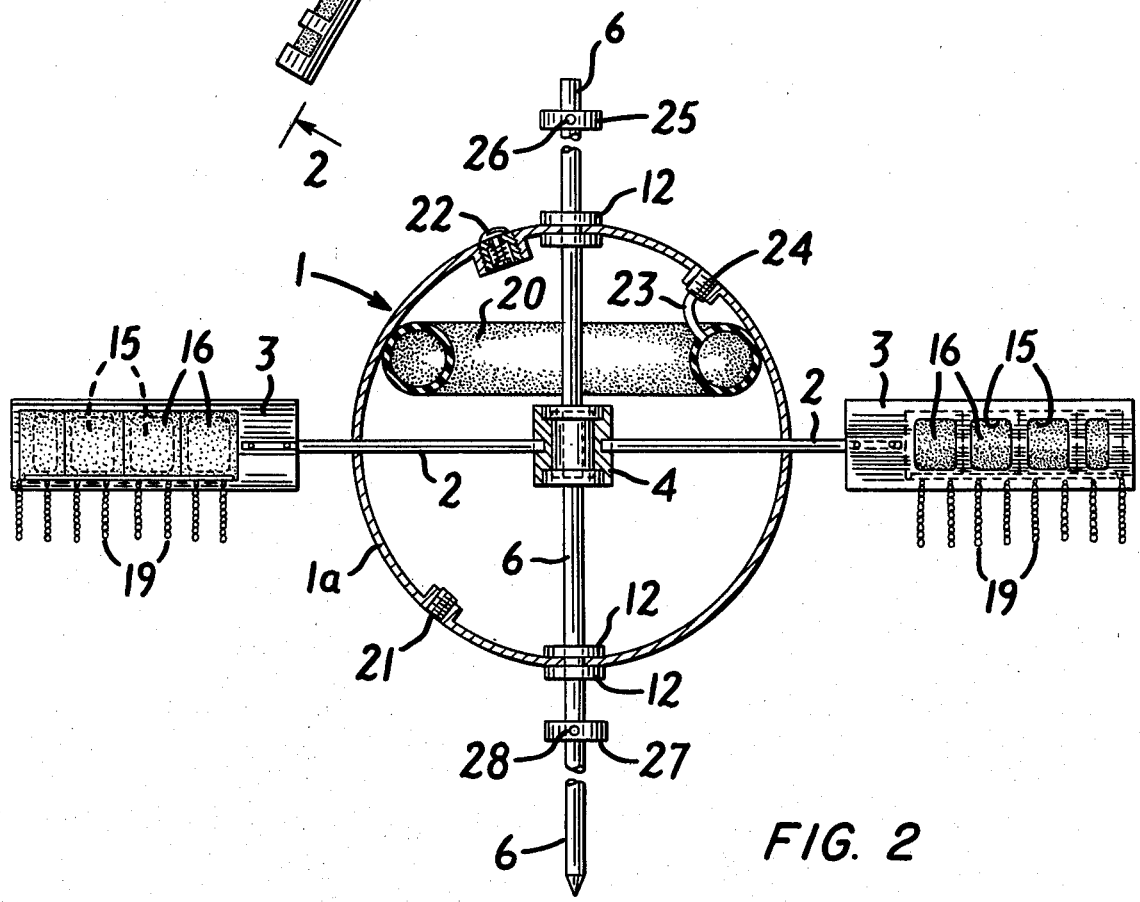
FIG. 2 is a composite vertical section taken, for the most part, on line 2—2 in FIG. 1 but with a portion in a different plane to show an air vent valve.

In FIGS. 7 and 8 there is shown another embodiment of the invention which in many respects is the same as or similar to that shown in FIGS. 1 and 2 so that it can be described more briefly. The unit comprises a hollow body 31 having a shell 31a which is ovoid in shape with the larger end up. A central pipe 32 extends vertically between plates 33 and 34 clamping an upper portion of the shell between them by bolts 35 and plates 36 and 37 clamping between them a lower portion of the shell by bolts 38. An upper set of radial arms 40 have inner ends held by a collar 41 on the pipe 32 and extend out through the shell. Paddle-like blade 42 is mounted on the outer end of each of the arms. A lower set of arms 43 have inner ends held by a collar 44 on the pipe 32 and extend out through the shell. A paddle-like blade 45 is mounted on each of the arms 43. While four arms and four blades have been shown in each set, it will be understood that a larger or smaller number can be used as described above.

The unit comprising the hollow body 31, arms 40, 43 and blades 42, 45 is rotatable on a shaft 46 which extends axially in the pipe 32. A frustoconical fitting 47 secured on the upper end of the shaft 46 is rotatable in a tapered thrust bearing 48. A lower portion of the shaft 46 is rotatable in a bearing sleeve 49 in a lower portion of the pipe 32. The bearings 48 and 49 are preferably formed from low friction material such as Teflon. The lower end of the shaft 46 projects through a hole in the plate 37 at the bottom of the hollow body 31 and is provided with an eye 50 attachment to suitable anchoring means. A screw eye 51 in the upper plate 33 is provided for lifting the unit for example in transporting and installing the unit.

Upper blades 42 are similar to the blades 3 of the unit shown in FIGS. 1 and 2 and in like manner are provided with openings 52 and flapper valves 53 so as to have an effective area with respect to flow of water which is greater in one direction than in the opposite direction. Hence, as described above, flow of water past the unit in the direction indicated by the arrow F in FIG. 7 produces rotation of the unit in a clockwise direction as indicated by the arrow A.

The lower blades 45 are similar to the upper blades 42 but do not have the openings 52 or flapper valves 53. Hence, the effective area of the lower blades is the same in both directions. With this arrangement the upper blades 42 constitute in effect means for driving the unit in rotation whereas the lower blades 45 constitute means for effecting local turbulence either for performing an excavating or dredging operation or for dissipating the energy of wave and current action as described above. Flexible erosion elements 55 shown in the form of chains depend from lower edges of the blades 45 of the lower set. As the unit shown in FIGS. 7 and 8 is generally larger and heavier than that shown in FIGS. 1 and 2, the chains 54 can be heavier than the chains 19 shown in FIG. 2. For example the chains in FIG. 2 may be of one inch galvanized chain while those in FIG. 8 may be 1½ inch or 2 inch chain.

The embodiment shown in FIGS. 7 and 8 like that in FIGS. 1 and 2 is provided with means for regulating the buoyancy of the hollow body 31. The buoyancy regulating means comprises in like manner an inflatable and expansible bladder 55 connected by a tube 56 with a valve-connector element 57 set in an upper portion of the shell 31a. Water ballast is admitted to the interior of the hollow body by a small hole in a screw plug 58 in a lower portion of the shell while air is permitted to escape through a vent valve 59 provided in an upper portion of the shell. Buoyancy of the unit is regulated in the manner described above with respect to the unit shown in FIGS. 1 and 2.

Units of the kind shown in FIGS. 7 and 8 can be used in the same manner as those shown in FIGS. 1 and 2 except that the shaft 46 is not driven into the bottom but rather is provided at its lower end with an eye 50 through which it can be secured to suitable anchoring means for example an anchor or a concrete block. Flow of water past the unit produces rotation whereupon local turbulence is created by the blades 42 and more particularly by the lower blades 45. By reason of its larger size and having two sets of blades, the unit shown in FIGS. 7 and 8 is suitable for heavier duty than that shown in FIGS. 1 and 2.

The size of the units may be varied according to the service for which they are intended. However, as a non-limiting example a unit of the kind shown in FIGS.

1 and 2 may have a body which is approximately 12 inches in diameter while the blades may be approximately 30 inches long and 9 inches wide. The larger unit shown in FIGS. 7 and 8 may have a body with a diameter of about 3 feet and blades which are 3 feet long and 12 inches wide.

While preferred examples of fluid dynamic erosion control units in accordance with the invention have been illustrated in the drawings and are herein particularly described, it will be understood that variations and modifications may be made and that the invention is in no way limited to the illustrated embodiments.

What I claim is:

1. A fluid dynamic erosion control unit comprising a hollow submersible body having a shell, means for regulating the buoyancy of said body, means for rotatably positioning said body in submerged condition for rotation about an approximately vertical axis, a plurality of arms extending laterally of said body, a paddle-like blade on each of said arms, each of said blades having an effective area defined by the area of a vertical projection of the blade, means for reducing the effective area of said blades when moving against a flow of water past said unit, whereby flow of water past said unit produces rotation of said unit by exerting a greater force on blades of larger effective area when moving in the direction of water flow than on blades of reduced effective area when moving in a direction against the flow of water.

2. A fluid dynamic erosion control unit according to claim 1, in which said means for reducing the effective area of said blades comprises at least one opening in each of said blades and valve means for permitting flow of water through said opening in one direction while blocking flow of water through said opening in the opposite direction.

3. A fluid dynamic erosion control unit according to claim 2, in which said valve means comprises a flexible flap secured to said blade adjacent said opening and movable between a closed position in which said flap covers said opening and an open position in which said flap uncovers said opening.

4. A fluid dynamic erosion control unit according to claim 3, in which said flap is secured to said blade below said opening.

5. A fluid dynamic erosion control unit according to claim 1, in which said blades are curved in cross-sectional shape.

6. A fluid dynamic erosion control unit according to claim 3, in which said blades are curved in cross sectional shape to provide a convex face and a concave face, said flap being secured on the concave face of the blade.

7. A fluid dynamic erosion control unit according to claim 1, in which said means for rotatably positioning said body comprises a central bearing block in said body, said arms having inner ends fixed to said bearing block, a shaft extending through said body and said bearing block, and bearing means positioned in said bearing block and receiving said shaft.

8. A fluid dynamic erosion control unit according to claim 7, in which said bearing means comprises a lineal ball bearing on said shaft and a rotary ball bearing between said lineal ball bearing and said bearing block to provide for movement of said body along said shaft and rotation of said body around said shaft.

9. A fluid dynamic erosion control unit according to claim 7, further comprising rotary seals between the shell of said body and said shaft.

10. A fluid dynamic erosion control unit according to claim 1, in which a plurality of flexible erosion elements depend from lower edges of said blades.

11. A fluid dynamic erosion control unit according to claim 1, in which a vertical tube extends vertically of said hollow body with lower and upper ends secured to the shell of said body, a collar fixed on said tube at the level of said arms, inner ends of said arms being fixed to said collar, a shaft extending longitudinally in said tube and bearing means between said tube and shaft.

12. A fluid dynamic erosion control unit according to claim 11, in which said bearing means comprise a conical thrust bearing and an axially spaced radial bearing.

13. A fluid dynamic erosion control unit according to claim 12, in which said shaft extends beyond the lower end of said tube externally of said body and is provided at its lower end with means for attachment to anchoring means.

14. A fluid dynamic erosion control unit according to claim 1, in which said means for regulating the buoyancy of said body comprises an inflatable and expansible air bladder inside said body, means for admitting water to fill said body except for the volume occupied by said bladder, and means for regulating the inflation of said bladder to vary the volume occupied by said bladder and thereby regulate the buoyancy of said body.

15. A fluid dynamic erosion control unit comprising a hollow submersible body, means for regulating the buoyancy of said body, means for rotatably positioning said body in submerged condition for rotation about an approximately vertical axis, a plurality of arms extending laterally of said body, and a paddle-like blade on each of said arms, said means for regulating the buoyancy of said body comprising an inflatable and expansible air bladder inside said body, means for admitting water to fill said body except for the volume occupied by said bladder, and means for regulating the inflation of said bladder to vary the volume occupied by said bladder and thereby regulating the buoyancy of said body.

16. A fluid dynamic erosion control unit comprising a hollow submersible body, means for regulating the buoyancy of said body, means for rotatably positioning said body in submerged condition for rotation about an approximately vertical axis, a first set of arms extending laterally of said body, a paddle-like blade on each of said arms, each of said blades having an effective area defined by the area of a vertical projection of the blade, means for reducing the effective area of said blades when moving against the flow of water past said unit, whereby flow of water past said unit produces rotation of said unit by exerting a greater force on blades when moving in the direction of water flow than on blades of reduced effective area when moving in a direction against the flow of water, a second set of arms extending laterally of said body and spaced vertically from said first set of arms, a paddle-like blade on each of said arms of said second set, said blades on said arms of said second set being of fixed effective area.

17. A fluid dynamic erosion control unit according to claim 16, in which said means for reducing the effective area of said blades of said first set comprises at least one opening in each of said blades and valve means for permitting flow of water through said opening in one direction and blocking flow of water through said opening in the opposite direction.

18. A fluid dynamic erosion control unit according to claim 16, in which said arms and blades of said second set are below said arms and blades of said first set.

19. A fluid dynamic erosion control unit according to claim 18, in which a plurality of flexible erosion elements depend from lower edges of blades of said second set.

* * * * *